(12) United States Patent
Wang

(10) Patent No.: US 11,707,100 B2
(45) Date of Patent: *Jul. 25, 2023

(54) MULTI-THREAT PROTECTION COMPOSITE

(71) Applicant: Milliken & Company, Spartanburg, SC (US)

(72) Inventor: Yunzhang Wang, Duncan, SC (US)

(73) Assignee: Milliken & Company, Spartanburg, SC (US)

( * ) Notice: Subject to any disclaimer, the term of this patent is extended or adjusted under 35 U.S.C. 154(b) by 284 days.

This patent is subject to a terminal disclaimer.

(21) Appl. No.: 16/743,037

(22) Filed: Jan. 15, 2020

(65) Prior Publication Data

US 2020/0281292 A1 Sep. 10, 2020

Related U.S. Application Data

(60) Provisional application No. 62/793,072, filed on Jan. 16, 2019.

(51) Int. Cl.
*A41D 31/24* (2019.01)
*A41B 1/08* (2006.01)
(Continued)

(52) U.S. Cl.
CPC .............. *A41D 31/245* (2019.02); *A41B 1/08* (2013.01); *A41D 1/04* (2013.01); *A41D 1/06* (2013.01);
(Continued)

(58) Field of Classification Search
CPC ........ B32B 7/12; A41D 31/245; A41D 13/00; A41D 31/00; D06N 3/0063
See application file for complete search history.

(56) References Cited

U.S. PATENT DOCUMENTS 1,213,118 A 1/1917 Lynch
3,563,836 A 2/1971 Dunbar
(Continued)

FOREIGN PATENT DOCUMENTS

GB 1 577 012 10/1973
GB 2 242 193 9/1991
(Continued)

OTHER PUBLICATIONS

Patent Cooperation Treaty PCT International Search Report, dated Jul. 3, 2020. International Application No. PCT/US2020/013716. International Filing Date: Jan. 15, 2020.
(Continued)

*Primary Examiner* — Peter Y Choi
(74) *Attorney, Agent, or Firm* — Cheryl J. Brickey

(57) ABSTRACT

A multi-threat protection composite containing at least 15 textile layers having an upper and lower surface and a non-blocking pressure sensitive adhesive (NonB-PSA) composition on at least the upper surface of each textile layer. The NonB-PSA coating contains a pressure sensitive adhesive and a plurality of first inorganic particles, wherein the ratio by weight of the first inorganic particles to the pressure sensitive adhesive is greater than about 1.2 and wherein the NonB-PSA coating is in an amount of at least about 10 g/m² on each surface the NonB-PSA coating is located. The first inorganic particles have a median primary particle size of less than about 5 micrometers.

17 Claims, 1 Drawing Sheet

US 11,707,100 B2
Page 2

(51) Int. Cl.
| | |
|---|---|
| *A41D 3/00* | (2006.01) |
| *A41D 1/06* | (2006.01) |
| *A41D 1/04* | (2006.01) |
| *A42B 3/04* | (2006.01) |
| *A43B 7/32* | (2006.01) |
| *A41D 13/00* | (2006.01) |
| *B32B 5/26* | (2006.01) |
| *B32B 7/12* | (2006.01) |
| *B32B 5/02* | (2006.01) |
| *D06N 3/00* | (2006.01) |
| *D06N 3/04* | (2006.01) |
| *D06N 3/14* | (2006.01) |

(52) U.S. Cl.
CPC ........... *A41D 3/00* (2013.01); *A41D 13/0002* (2013.01); *A42B 3/04* (2013.01); *A43B 7/32* (2013.01); *B32B 5/024* (2013.01); *B32B 5/26* (2013.01); *B32B 7/12* (2013.01); *D06N 3/0063* (2013.01); *D06N 3/0068* (2013.01); *D06N 3/042* (2013.01); *D06N 3/14* (2013.01); *A41D 2500/20* (2013.01); *B32B 2250/05* (2013.01); *B32B 2250/20* (2013.01); *B32B 2255/02* (2013.01); *B32B 2255/205* (2013.01); *B32B 2262/0269* (2013.01); *B32B 2307/581* (2013.01); *B32B 2437/02* (2013.01); *B32B 2437/04* (2013.01); *D06N 2201/0272* (2013.01); *D06N 2209/103* (2013.01); *D06N 2211/10* (2013.01)

(56) References Cited

U.S. PATENT DOCUMENTS

| | | | |
|---|---|---|---|
| 3,601,923 | A | 8/1971 | Rosenberg |
| 4,186,648 | A | 2/1980 | Clausen et al. |
| 4,292,882 | A | 10/1981 | Clausen |
| 4,425,080 | A | 1/1984 | Stanton et al. |
| 4,623,574 | A | 11/1986 | Harpell et al. |
| 4,690,825 | A | 9/1987 | Won |
| 4,879,165 | A | 11/1989 | Smith |
| 4,916,000 | A | 4/1990 | Li et al. |
| 4,961,685 | A | 10/1990 | Neubert |
| 4,969,386 | A | 11/1990 | Sandstrom et al. |
| 5,011,183 | A | 4/1991 | Thornton et al. |
| 5,035,111 | A | 7/1991 | Hogenboom et al. |
| 5,045,371 | A | 9/1991 | Calkins |
| 5,110,661 | A | 5/1992 | Groves |
| 5,145,675 | A | 9/1992 | Won |
| 5,225,241 | A | 7/1993 | Dischler |
| 5,275,873 | A | 1/1994 | Chitrangad |
| 5,322,721 | A | 6/1994 | McGinnis, Jr. et al. |
| 5,402,703 | A | 4/1995 | Drotleff |
| 5,437,905 | A | 8/1995 | Park |
| 5,443,882 | A | 8/1995 | Park |
| 5,443,883 | A | 8/1995 | Park |
| 5,466,503 | A | 11/1995 | Dischler |
| 5,547,536 | A | 8/1996 | Park |
| 5,569,509 | A | 10/1996 | Dischler |
| 5,580,629 | A | 12/1996 | Dischler |
| 5,776,839 | A | 7/1998 | Dischler et al. |
| 5,827,591 | A | 10/1998 | Blok |
| 5,880,042 | A | 3/1999 | Schuster et al. |
| 6,133,169 | A | 10/2000 | Chiou et al. |
| 6,248,676 | B1 | 6/2001 | Dischler |
| 6,475,936 | B1 | 11/2002 | Chiou |
| 6,543,055 | B2 | 4/2003 | Howland et al. |
| 6,656,570 | B1 | 12/2003 | Fels et al. |
| 6,737,368 | B2 | 5/2004 | Chiou |
| 6,846,548 | B2 | 1/2005 | Harpell et al. |
| 6,893,989 | B2 | 5/2005 | Breukers |
| 7,642,206 | B1 | 1/2010 | Bhatnagar et al. |
| 7,825,048 | B2 | 11/2010 | Wang et al. |
| 7,858,540 | B2 * | 12/2010 | Ardiff ................. C08L 9/02 442/134 |
| 7,910,502 | B1 * | 3/2011 | Hurst .................. B32B 5/26 442/135 |
| 7,958,812 | B2 | 6/2011 | Wang |
| 8,236,711 | B1 | 8/2012 | Wang ..................... 442/134 |
| 8,450,222 | B2 | 5/2013 | Pritchard et al. |
| 8,689,671 | B2 | 4/2014 | Hummel |
| 9,194,662 | B1 | 11/2015 | Poulsen |
| 9,387,644 | B1 | 7/2016 | Brennan |
| 10,111,491 | B2 | 10/2018 | Tanabe |
| 10,513,805 | B2 | 12/2019 | Wang |
| 10,513,806 | B2 | 12/2019 | Wang |
| 2002/0106957 | A1 | 8/2002 | Ritter |
| 2004/0016036 | A1 | 1/2004 | Bachner, Jr. |
| 2004/0048109 | A1 | 3/2004 | Granqvist et al. |
| 2004/0048536 | A1 | 3/2004 | Granqvist et al. |
| 2004/0048538 | A1 | 3/2004 | Granqvist et al. |
| 2005/0266748 | A1 | 12/2005 | Wagner et al. |
| 2007/0173150 | A1 | 7/2007 | Bhatnagar |
| 2012/0141720 | A1 | 6/2012 | Bader et al. |
| 2016/0326690 | A1 | 11/2016 | Rozant et al. |
| 2020/0223181 | A1 | 7/2020 | Wang |
| 2021/0078263 | A1 | 3/2021 | Wang |
| 2021/0078285 | A1 | 3/2021 | Wang |

FOREIGN PATENT DOCUMENTS

| | | |
|---|---|---|
| WO | WO 2001/096111 | 12/2001 |
| WO | WO 2006/121411 | 11/2006 |
| WO | WO 2007/084104 | 7/2007 |
| WO | WO 2010/142028 | 12/2010 |
| WO | WO 2011/024011 | 3/2011 |
| WO | WO 2016/187009 | 11/2016 |

OTHER PUBLICATIONS

Patent Cooperation Treaty PCT International Search Report, dated Jul. 3, 2020. International Application No. PCT/US2020/013706. International Filing Date: Jan. 15, 2020. 3 pages.
PCT/US2020/050190 7217WO International Search Report, dated Dec. 9, 2020. International Filing Date: Sep. 10, 2020, 4 pages.
PCT/US2020/050190 7217WO International Written Opinion, International Filing Date: Sep. 10, 2020, 8 pages.
PCT/US2020/050192 7218WO International Search Report, dated Dec. 9, 2020. International Filing Date: Sep. 10, 2020, 4 pages.
PCT/US2020/050192 7218WO International Written Opinion, International Filing Date: Sep. 10, 2020, 7 pages.
International Preliminary Report on Patentability for App. No. PCT/US2020/050190, dated Mar. 24, 2022, 10 pages.
International Preliminary Report on Patentability for App. No. PCT/US2020/050192, dated Mar. 24, 2022, 9 pages.

* cited by examiner

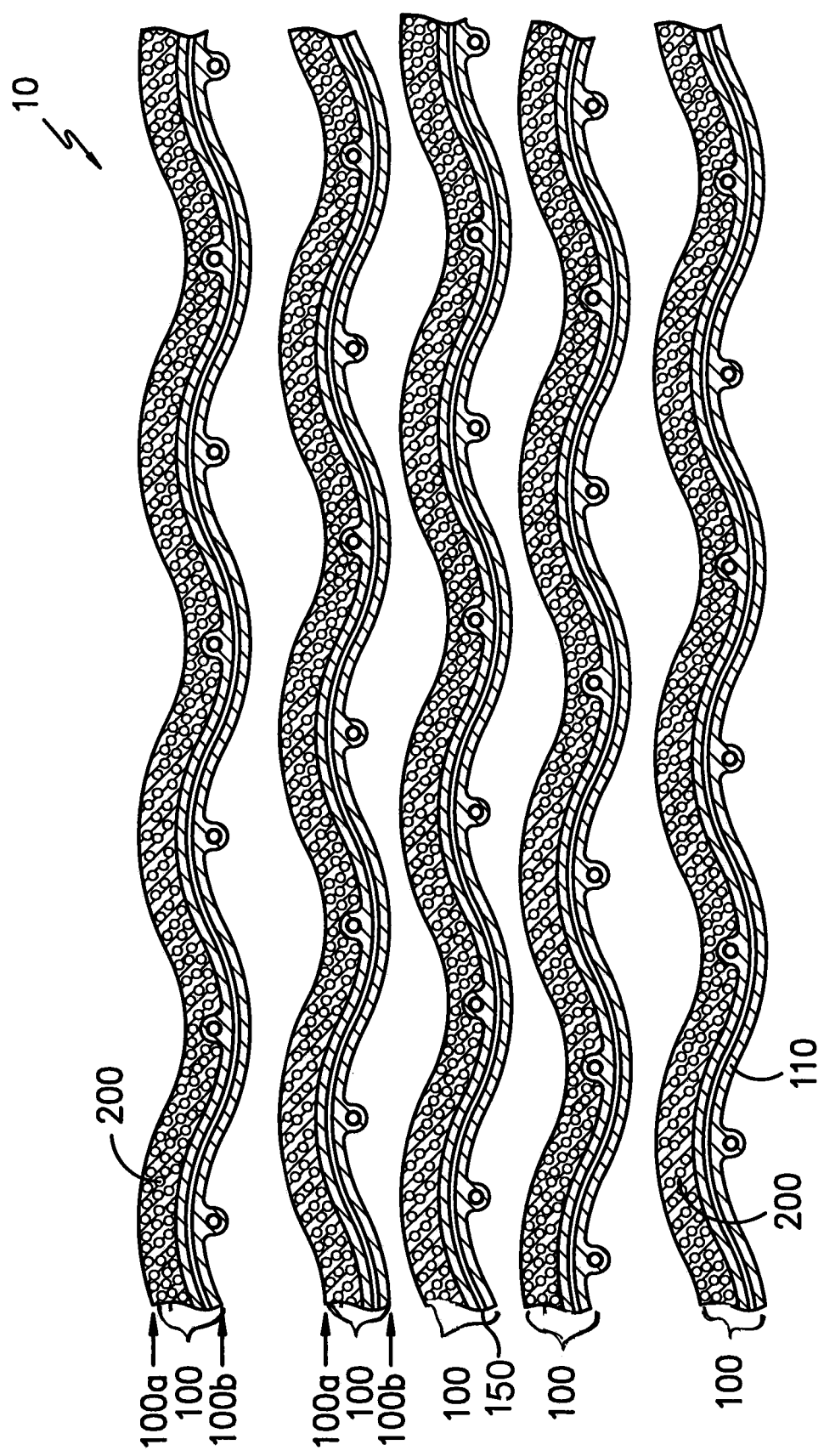

MULTI-THREAT PROTECTION COMPOSITE

RELATED APPLICATIONS

This application claim priority to U.S. Provisional Patent Application 62/793,072, filed on Jan. 15, 2019.

FIELD OF THE INVENTION

The present application is directed to a multi-threat protection composite and articles containing the multi-threat protection composite.

BACKGROUND

Police officers, military personnel, correctional officers, security personnel, and even private individuals have a growing need for protection from threats including spikes, knives, shrapnel, and bullets that give good protection while being light, flexible, and less expensive. It is a primary object to provide a flexible light weight structure that resists penetration by many threats.

BRIEF SUMMARY OF THE INVENTION

In one embodiment, a multi-threat protection composite containing at least one textile layer and a non-blocking pressure sensitive adhesive (NonB-PSA) composition on at least the upper surface of each layer is disclosed. The NonB-PSA coating comprises a pressure sensitive adhesive and a plurality of first inorganic particles. The ratio by weight of the first inorganic particles to the pressure sensitive adhesive is greater than about 1 and the NonB-PSA coating is in an amount of at least about 10 g/m² on each surface the NonB-PSA coating is located.

In another embodiment, a multi-threat protection composite containing a plurality of textile layers and a NonB-PSA composition on at least the upper surface of each layer is disclosed. The NonB-PSA coating comprises a pressure sensitive adhesive and a plurality of first inorganic particles. The ratio by weight of the first inorganic particles to the pressure sensitive adhesive is greater than about 0.5 and the NonB-PSA coating is in an amount of at least about 5 g/m² on each surface the NonB-PSA coating is located.

In another embodiment, a multi-threat protection composite containing at least five textile layers and a NonB-PSA composition on at least the upper surface of each layer is disclosed. The NonB-PSA coating comprises a pressure sensitive adhesive and a plurality of first inorganic particles. The ratio by weight of the first inorganic particles to the pressure sensitive adhesive is greater than about 0.5 and the NonB-PSA coating is in an amount of at least about 5 g/m² on each surface the NonB-PSA coating is located.

In another embodiment, a multi-threat protection composite containing at least 15 textile layers and a NonB-PSA composition on at least the upper surface of each layer is disclosed. The NonB-PSA coating comprises a pressure sensitive adhesive and a plurality of first inorganic particles. The ratio by weight of the first inorganic particles to the pressure sensitive adhesive is greater than about 1.2 and the NonB-PSA coating is in an amount of at least about 10 g/m² on each surface the NonB-PSA coating is located. The first inorganic particles have a median primary particle size of less than about 5 micrometers.

BRIEF DESCRIPTION OF THE DRAWINGS

FIG. 1 is a sectional view of one embodiment of a multi-threat protection composite.

DETAILED DESCRIPTION OF THE INVENTION

The invention is directed to a flexible spike and knife (and optionally ballistic) resistant composite. As utilized herein, the term "spike resistant" is generally used to refer to a material that provides protection against penetration of the material by sharp-pointed weapons or objects, such as an ice pick. Thus, a "spike resistant" material can either prevent penetration of the material by such an object or can lessen the degree of penetration of such an object as compared to similar, non-spike resistant materials. As utilized herein, the term "knife resistant" is generally used to refer to a material that provides protection against penetration of the material by edged blades such as knives and other knife-like weapons or objects. Thus, a "knife resistant" material can either prevent penetration of the material by such an object or can lessen the degree of penetration of such an object as compared to similar, non-knife resistant materials.

Preferably, a "spike resistant" material achieves a pass rating when tested against Level 1, Spike class threats in accordance with National Institute of Justice (NIJ) Standard 0115.00 (2000), entitled "Stab Resistance of Personal Body Armor." The term "spike resistant" can also refer to materials (e.g., a composite according to the invention) achieving a pass rating when tested against higher level threats (e.g., Level 2 or Level 3). Preferably, a "knife resistant" material achieves a pass rating when tested against Level 1, edged blade class threats in accordance with National Institute of Justice (NIJ) Standard 0115.00 (2000), entitled "Stab Resistance of Personal Body Armor." The term "knife resistant" can also refer to materials (e.g., a composite according to the invention) achieving a pass rating when tested against higher level threats (e.g., Level 2 or Level 3).

In certain possibly preferred embodiments, the invention can also be directed to a spike, knife, shrapnel, and ballistic resistant flexible composite. As utilized herein, the term "ballistic resistant" generally refers to a material that is resistant to penetration by ballistic projectiles. Thus, a "ballistic resistant" material can either prevent penetration of the material by a ballistic projectile or can lessen the degree of penetration of such ballistic projectiles as compared to similar, non-ballistic resistant materials. Preferably, a "ballistic resistant" material provides protection equivalent to Type I body armor when such material is tested in accordance with National Institute of Justice (NIJ) Standard 0101.06 (2006), entitled "Ballistic Resistance of Personal Body Armor." The term "ballistic resistant" also refers to a material that achieves a pass rating when tested against Level 1 or higher (e.g., Level IIA, Level II, Level IIIA, or Level III or higher) ballistic threats in accordance with NIJ Standard 0101.06.

The multi-threat protection composite provides some protection for at least one of the knife, spike, shrapnel, and ballistic threats. In one embodiment, the multi-threat protection composite provides some protection against knife threats. In another embodiment, the multi-threat protection composite provides some protection against spike threats. Preferably, the multi-threat protection composite provides some protection for at least two of the knife, spike, and ballistic threats. In a preferred embodiment, the multi-threat protection composite provides some protection for all of the knife, spike, and ballistic threats.

Referring now to FIG. 1, there is shown an embodiment of the multi-threat protection composite 10. The multi-threat protection composite shown in the FIGURE contains five coated textile layers 100, wherein each layer has an upper 100a and lower surface 100b. Please note that FIG. 1 components are not drawn to scale, the coatings 110 and 200 are enlarged relative to the textile 150 as compared to typical real life end use as to more easily show the coatings.

The number of coated textile layers 100 is determined by the end use of the composite and what threat level the composite is designed to resist. The minimum number of coated textile layers is 1, or in some embodiments 3. In one embodiment, a composite may contain 1 coated textile layer 100 along with other textile or non-textile layers within the composite. In another embodiment, the composite 10 may contain 2, 3, 4 or more coated textile layers 100. In one preferred embodiment, the composite 10 contains at least about 3 coated textile layers 100. In one preferred embodiment, the composite 10 contains at least about 5 coated textile layers 100. In another preferred embodiment, the composite 10 contains at least about 15 coated textile layers 100. In another preferred embodiment, the composite 10 contains at least about 22 coated textile layers 100. In another embodiment, the composite contains between about 5 and 40 coated textile layers 100.

Individual coated textile layers 100 and especially a grouping of the textile layers 10 in a pack are desired to provide maximum flexibility and protection against threats. While each layer of the resin/film laminated or coated prior art material is relatively stiff, the textile layer 150 with NonB-PSA composition 200 is much more flexible and only slightly stiffer than an untreated textile layer. Multi-threat resistance is able to be achieved while maintaining a high degree of comfort. The flexibility can be quantified by the Static Flexibility Test typically used for single layers and the Dynamic Flexibility Test typically used for multilayer composites as specified in US Patent Application 2012/0141720, which is herein incorporated by reference.

In one preferred embodiment, the coated textile layer 100 comprises at least one textile layer 150 with a NonB-PSA composition 200 on at least one side of the layer 150. In another embodiment, the composite 10 comprises at least one coated textile layer 100 with a NonB-PSA composition 200 on at least one side of a textile layer 150.

At least one coated textile layer 100 within the composite 10 contains a NonB-PSA composition 200 on at least one surface (the upper surface 100a or the lower surface 100b). In a preferred embodiment, the NonB-PSA composition 200 is located on at least one of the surfaces 100a, 100b of at least 90% of the textile layers 150, more preferably all of the textile layers 150. In a preferred embodiment, the NonB-PSA composition 200 is located on both the upper and lower surfaces of at least some of the textile layers 150, more preferably all of the textile layers 150. In FIG. 1, the NonB-PSA composition 200 is located on the first surfaces 100a of each textile layer 150.

The (NonB-PSA) composition 200 comprises a pressure sensitive adhesive (PSA) and a plurality of first inorganic particles. The term "pressure sensitive adhesive" is commonly used to designate a distinct category of adhesive tapes and adhesives, which in dry form (essentially solvent/water free), are aggressively and permanently tacky at room temperature and that readily adhere to a variety of dissimilar surfaces upon mere contact without the need of more than finger or hand pressure. These products require no activation by water, solvent, or heat in order to exert an adhesive holding force toward such materials as paper, plastic, glass, wood, cement, and metal. They have sufficient cohesive holding power and elastic nature so that, despite their aggressive tackiness, they can be handled with the fingers and removed from smooth surfaces without leaving a residue. Generally, PSAs are a class of viscoelastic polymers, but not all viscoelastic polymers are PSAs. In one embodiment, the pressure sensitive adhesive is selected from the group consisting of natural rubber, styrene-butadiene rubber, reclaimed rubber, butyl rubber, butadiene-acrylonitrile rubber, thermoplastic elastomers, polyacrylates, polyvinylalkylethers, and silicone. In a preferred embodiment, the pressure sensitive adhesive is an acrylic polymer due to its desirable physical properties. In one embodiment, the pressure sensitive adhesive has a $T_g$ of less than about $-20°$ C. In another embodiment, the pressure sensitive adhesive has a $T_g$ of less than about $-40°$ C.

The pressure sensitive adhesive is an important component in the NonB-PSA composition of the present invention. As mentioned before, a special feature of pressure sensitive adhesives is that they do not solidify to form a solid material. They typically remain permanently tacky and can wet surfaces on contact and form bonds when pressure (typically light pressure) is applied. As a result, the NonB-PSA coating composition shows excellent adhesion to the coated substrate. On the other hand, the permanently tacky nature of PSA may cause problems in the intended body armor applications. In a body armor the fabric layers are generally used as a multi-layer stack. The permanent tackiness of the PSA will cause the otherwise flexible multi-layer stack of coated fabric to become a more rigid "brick", which is highly undesirable. The incorporation of high concentration of particles in the NonB-PSA composition resolves this issue. When high enough concentration of particles is incorporated into the PSA, the particles act as an anti-blocking agent. Furthermore, the particles also act as a reinforcing agent, improving the mechanical properties of the PSA. The inventive NonB-PSA coating composition incorporating PSA and high concentration of particles exhibit outstanding friction to metals such as steel (due to the permanent tackiness of the PSA) without sticking to itself (due to the anti-blocking property of particles). As a result, the coated substrate will tenaciously "grab" the weapons (knife and spike) in a stab event, reducing/minimizing the weapon penetration. While any PSA might be used in the present invention, PSAs with low Tg (glass transition temperature) are preferred due to their superior softness and flexibility. PSAs with high Tg will result in a stiffer coated substrate, which is less desirable. Non-pressure sensitive polymers, even with low Tg, generally exhibit less friction with metals (hence less grabbing force), resulting in less protective power against stabbing weapons than pressure sensitive adhesives.

As mentioned previously, the pressure sensitive adhesive is a component in the NonB-PSA composition of the present invention. The rolling ball tack test as described in the test method ASTM D3121 (Standard Test Method for Tack of Pressure-Sensitive Adhesives by Rolling Ball) can be used to distinguish a PSA from non-PSA materials. The rolling ball tack test is a measure of the capacity of the adhesive to form a bond with the surface of another material upon brief contact under virtually no pressure and can be used to quantify the ability of an adhesive to adhere quickly to another surface. To determine if a material is a pressure sensitive adhesive, the material to be evaluated is first coated onto a PET film substrate and dried. The coating thickness should be thick enough to show the true material properties. Generally, the thickness should be at least 0.5 mm. The coated substrate at room temperature is then subject to the rolling ball tack test as described in ASTM D3121 and the stopping distance of the rolling ball is measured. Typically, the smaller the stopping distance, the higher the ability of the adhesive to adhere quickly to other surfaces. The ball should stop within 12 inches for a PSA material while for non-PSA material the ball should continue rolling past 12-inch mark. Therefore, in this application, a PSA is defined to be a material that stops the ball within 12 inches or less using ASTM D3121.

A high concentration of inorganic particle is another component in the NonB-PSA composition of the present invention. The first inorganic particles within the composition 200 may be any suitable material, size, and amount. In one embodiment, the first inorganic particles are metal oxides such as titanium dioxide. In another embodiment, the first inorganic particles preferably contain silica (silicon dioxide) and/or alumina (aluminum oxide). In one embodiment, the first inorganic particles are metalloid oxide. In another embodiment, the first inorganic particles contain a carbide particle, preferably silicon carbide and/or titanium carbide.

Preferably, the first inorganic particles have a median primary particle diameter size of less than about 10, more preferably 5, more preferably 2 microns. More preferably, the first inorganic particles have a median primary particle diameter size of less than about 0.5 microns. Even more preferably the first inorganic particles have a median primary particle diameter size in a range of between about 5 nm and 2 microns, more preferably between about 5 and 1 micron. Even more preferably the first inorganic particles have a median primary particle diameter size in a range of between about 5 nm and 250 nm, more preferably between about 5 and 100 nm. Particles too big and too small may have less desirable anti-blocking and reinforcing properties for some end use applications. The particles in some embodiment may be aggregated and/or agglomerated, and those aggregated/agglomerated particles may have a median agglomerate diameter larger than 2 microns, with the median primary particle diameter size preferably in the 5 to 250 nm range. In one embodiment, the median primary particle diameter size of the first inorganic particles is less than 1 micrometer.

The ratio by weight of the first inorganic particles to the pressure sensitive adhesive is preferably greater than about 0.5, more preferably greater than 1.0, more preferably greater than 1.2, more preferably greater than 1.5. In other embodiments, including embodiments with a plurality of coated textile layers 100 or less aggressive PSAs, the ratio by weight of the first inorganic particles to the pressure sensitive adhesive is greater than about 0.5 (meaning the PSA is in a weight of twice that of the first inorganic particles.) In other embodiments, the ratio by weight of the first inorganic particles to the pressure sensitive adhesive is greater than about 1.2 (meaning the first inorganic particles are in a weight of at least 1.2 times the weight of the PSA). In one embodiment, the first inorganic particles are in an amount of greater than about 50% by weight of the NonB-PSA composition, more preferably greater than about 60% by weight of the NonB-PSA composition. In another embodiment, the first inorganic particles are in an amount of between about 50% and 95% by weight of the NonB-PSA composition, more preferably about 50% and 80% by weight of the NonB-PSA composition. In a preferred embodiment, the NonB-PSA composition is located on both the upper and lower surfaces of the textile layers.

Blocking refers to undesirable adhesion between two adjacent layers of fabric within the composite. Although there is PSA in the NonB-PSA coating composition, the coated substrate is essentially non-tacky and non-blocking due to the presence of particles in the composition. The particles create micro-roughness at the surface, which reduce or eliminate blocking caused by the tackiness of the PSA. The non-blocking property can be tested according to ASTM D751-06 (Standard Test Methods for Coated Fabrics). In a preferred embodiment, the coated textile layers readily achieve the best rating 1—No Blocking. Coated substrates separate without any evidence of adhering. In this application, non-blocking is defined to be a rating of 1-no blocking according to ASTM D751-06.

In another embodiment, the coated textile layers 100 have a very slight tackiness. This may cause the composite 10 to be slightly less flexible and stiffer, but there are many end uses where flexibility is less of a concern. In these cases, the coating does not have to be characterized as a NonB-PSA, but could be referred to as a particle loaded PSA. Typically, these blocking characteristics are less than that of traditional sticky notes (e.g. POST-IT® notes by 3M).

The NonB-PSA coating 200 is in an amount of at least about 5 g/m$^2$ on each surface the NonB-PSA composition is located (at least on one surface 100a, 100b) within each coated textile layer 100. More preferably, the composition is in an amount of at least about 10 g/m$^2$, more preferably 20 g/m$^2$ on each surface the NonB-PSA composition is located. In another embodiment, the NonB-PSA composition is in an amount between about 25 and 50 g/m$^2$ on each surface the NonB-PSA composition is located. In another embodiment, the NonB-PSA composition is in an amount between about 5 and 40 g/m$^2$ on each surface the NonB-PSA composition is located. In the embodiments where the NonB-PSA composition is located on both surfaces 100a, 100b of the coated textile layers 100, then the total amount coated would be approximately twice that of the same coated textile layer single-side coated.

Preferably the NonB-PSA composition 200 is located on the surface of the textile layers 150 without substantial penetration into the yarn bundles to achieve high flexibility of the coated textile layers. A pre-coating to the textile layers 150 before coating the NonB-PSA composition may be needed to more accurately control the location of the NonB-PSA composition.

The NonB-PSA coating composition 200 may also contain additional additives such as an anti-microbial agent, fire retardant, rheology modifier, surfactants, water repellents, and pigments/dyes. These additional additives and the amounts added to the NonB-PSA depend on the desired properties of the end use composite 10.

The textile layers 150 can be any suitable textile including a woven, knit, or nonwoven textile. As will be understood by those of ordinary skill in the art, each textile layer within the composite can be independently provided in each of the aforementioned suitable constructions.

The textile layers 150 are preferably woven textiles. Each textile layer 150 contains a plurality of interlocking yarns or fibers having a tenacity of about 5 or more grams per denier, more preferably about 8 or more, more preferably about 10 or more, more preferably about 14 or more, more preferably 15 or more. In one embodiment, the yarns or fibers having a tenacity of about 5 to 70 grams per denier. In a preferred embodiment, the plurality of yarns or fibers have a tenacity of about 10 or more grams per denier and have a size of less than ten denier per filament, more preferably less than 5 denier per filament. In one embodiment, the fibers have an average diameter of less than about 20 micrometers, more preferably less than about 10 micrometers. The textile layers 150 can have any suitable weight. In certain possibly preferred embodiments, the textile layers can have a weight of about 2 to about 10 ounces per square yard.

The yarns may have any suitable denier, preferably in the range between about 100 to 2,000 denier. In one embodiment, the yarns have a denier in the range of between about 100 and 3,000. In another embodiment, the yarns have a denier in the range of between about 200 and 2,000. In another embodiment, the yarns have a denier in the range of between about 300 and 1,500. Preferably, the yarn is a filament yarn. Also, it is preferred that the fabric construction is roughly balanced meaning roughly equal ends and picks per inch.

For the fibers or yarns interwoven in the textile layers 150 a non-inclusive listing of suitable fibers and yarns include: fibers made from highly oriented polymers, such as gel-spun ultrahigh molecular weight polyethylene fibers, melt-spun polyethylene fibers, extruded polypropylene fibers and tapes, melt-spun nylon fibers, melt-spun polyester fibers, and sintered polyethylene fibers and tapes. Suitable fibers also include those made from rigid-rod polymers, such as lyotropic rigid-rod polymers, heterocyclic rigid-rod polymers, and thermotropic liquid-crystalline polymers. Suitable fibers made from lyotropic rigid-rod polymers include aramid fibers, such as poly(p-phenyleneterephthalamide) fibers and fibers made from a 1:1 copolyterephthalamide of 3,4'-diaminodiphenylether and p-phenylenediamine. Suitable fibers made from heterocyclic rigid-rod polymers, such as p-phenylene heterocyclics, include poly(p-phenylene-2,6-benzobisoxazole) fibers (PBO fibers), poly(p-phenylene-2,6-benzobisthiazole) fibers (PBZT fibers), and poly[2,6-diimidazo[4,5-b:4',5'-e] pyridinylene-1,4-(2,5-dihydroxy) phenylene] fibers (PIPD fibers). Suitable fibers made from thermotropic liquid-crystalline polymers include poly(6-hydroxy-2-napthoic acid-co-4-hydroxybenzoic acid) fibers. Suitable fibers also include carbon fibers, such as those made from the high temperature pyrolysis of rayon, polyacrylonitrile, and mesomorphic hydrocarbon tar. In certain possibly preferred embodiments, the yarns or fibers 113 and 212 comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxybenzoic acid) fibers, carbon fibers, and combinations thereof. In one particularly preferred embodiment, the textile layer comprises aramid fibers.

For the embodiment where the textile layers 150 are in a woven construction, the woven layer preferably includes a multiplicity of warp and weft elements interwoven together such that a given weft element extends in a predefined crossing pattern above and below the warp element. One preferred weave is the plain weave where each weft element passes over a warp element and thereafter passes under the adjacent warp element in a repeating manner across the full width of the textile layer. Thus, the terms "woven" and "interwoven" are meant to include any construction incorporating interengaging formation of fibers or yarns.

Other suitable weave patterns may be used for the woven fabric (and the composite may also contain fabric layers having different weave patterns). By way of example only, and not limitation, it is contemplated that the weft yarns may pass over two or more adjacent warp yarns before transferring to a position below one or more adjacent warp yarns thereby forming a so-called twill weave. Suitable twill weaves include both warp-faced and fill-faced twill weaves, such as 2/1, 3/1, 3/2, 4/1, 1/2, 1/3, or 1/4 twill weaves. The weave may also be any other suitable weave pattern, for example, satin, basket-weave, poplin, jacquard, and crepe weave textiles.

In one embodiment, the textile layers 150 have a tightness factor of greater than about 0.75 as defined in U.S. Pat. No. 6,133,169 (Chiou) and U.S. Pat. No. 6,103,646 (Chiou), which are incorporated herein by reference. "Fabric tightness factor" and "Cover factor" are names given to the density of the weave of a fabric. Cover factor is a calculated value relating to the geometry of the weave and indicating the percentage of the gross surface area of a fabric that is covered by yarns of the fabric. The equation used to calculate cover factor is as follows (from Weaving: Conversion of Yarns to Fabric, Lord and Mohamed, published by Merrow (1982), pages 141-143):

$d_w$=width of warp yarn in the fabric
$d_f$=width of fill yarn in the fabric
$p_w$=pitch of warp yarns (ends per unit length)
$p_f$=pitch of fill yarns $$C_w = \frac{d_w}{p_w} C_f = \frac{d_f}{p_f}$$

$$\text{Fabric\_Cover\_Factor} = Cfab = \frac{\text{total\_area\_obsured}}{\text{area\_enclosed}}$$

$$C_{fab} = \frac{(p_w - d_w)d_f + d_w p_f}{p_w p_f}$$

$$C_{fab} = (C_f + C_w - C_f C_w)$$

Depending on the kind of weave of a fabric, the maximum cover factor may be quite low even though the yarns of the fabric are situated close together. For that reason, a more useful indicator of weave tightness is called the "fabric tightness factor". The fabric tightness factor is a measure of the tightness of a fabric weave compared with the maximum weave tightness as a function of the cover factor.

$$\text{Fabric\_tightness\_factor} = \frac{\text{actual\_cover\_factor}}{\text{maximum\_cover\_factor}}$$

For example, the maximum cover factor that is possible for a plain weave fabric is 0.75; and a plain weave fabric with an actual cover factor of 0.68 will, therefore, have a fabric tightness factor of 0.91. The preferred weave for practice of this invention is plain weave.

In one embodiment, at least a portion of the textile layers 150 comprise about 10 wt. % or less, based on the total weight of the textile layer, of a pre-coating 110 (shown in FIG. 1) comprising a plurality of second inorganic particles having a diameter of about 20 μm or less on at least one side of the textile layer 150. More preferably, the plurality of second inorganic particles have a diameter of about 4 μm or less, more preferably a diameter of about 2 μm or less. In one embodiment, at least 50% by number of the textile layers 150 contain the pre-coating. In another embodiment, at least 75% by number, more preferably at least about 90% by number of the textile layers 150 contain the pre-coating. In another embodiment, each (essentially 100% by number) of the textile layers 150 contain the pre-coating.

It has been found that pre-coated textile layers 150 with 110 had significantly higher spike penetration resistance as compared to the same construction of textile layers without the pre-coating. The key mechanism of improved spike penetration resistance of the treated fabric is believed to be inter-layer interactions.

It is preferred that the pre-coating 110 is carried out using a padding technique in which the textile layer is immersed in the coating composition and then passed through a pair of nip rollers to remove any excess liquid. The padding process allows the coating composition to be present throughout the textile layer.

The pre-coating 110 applied to the textile layers 150 comprises particulate matter (e.g., second inorganic particles). The second inorganic particles included in the pre-coating 110 can be any suitable particles. Second inorganic particles suitable for use in the pre-coating include, but are not limited to, silica particles, (e.g., fumed silica particles, precipitated silica particles, alumina-modified colloidal silica particles, etc.), alumina particles (e.g. fumed alumina particles), and combinations thereof. In certain possibly preferred embodiments, the second inorganic particles are comprised of at least one material selected from the group consisting of fumed silica, precipitated silica, fumed alumina, alumina modified silica, zirconia, titania, silicon carbide, titanium carbide, tungsten carbide, titanium nitride, silicon nitride, and the like, and combinations thereof. Such second inorganic particles can also be surface modified, for instance by grafting, to change surface properties such as charge and hydrophobicity. In certain possibly preferred embodiments, the second inorganic particles can have a positive surface charge when suspended in an aqueous medium, such as an aqueous medium having a pH of about 4 to 8. In certain possibly preferred embodiments, the second inorganic particles can have a Mohs' hardness of about 5 or more, or about 6 or more, or about 7 or more. Second inorganic particles suitable for use in this embodiment include, but are not limited to, fumed alumina particles. In certain possibly preferred embodiments, the second inorganic particles can have a three-dimensional branched or chain-like structure comprising or consisting of aggregates of primary particles.

The second inorganic particles included in the pre-coating 110 can be modified to impart or increase the hydrophobicity of the particles. For example, in those embodiments comprising fumed silica particles, the fumed silica particles can be treated, for example, with an organosilane in order to render the fumed silica particles hydrophobic. Such particles and coatings are believed to be more fully described in U.S. Patent Publication No. 2007/0105471 (Wang et al.), incorporated herein by reference.

The coated textile layers 100 can comprise any suitable amount of the pre-coating 110. As will be understood by those of ordinary skill in the art, the amount of pre-coating applied to the textile layers 150 generally should not be so high that the weight of the composite 10 is dramatically increased, which could potentially impair its end uses. Typically, the amount of coating 110 applied to the textile layers 150 will comprise about 10 wt. % or less of the total weight of the textile layer 150. In certain possibly preferred embodiments, the amount of pre-coating applied to the textile layers 150 will comprise about 7 wt. % or less or about 5 wt. % or less, or about 3 wt. % or less of the total weight of the textile layer 150. Typically, the amount of pre-coating applied to the textile layers 150 will comprise about 0.1 wt. % or more, or about 0.5 wt. % or more of the total weight of the textile layer 150. In certain possibly preferred embodiments, the coating comprises about 2 to about 4 wt. % of the total weight of the textile layer 150. Typically, the dry add-on of the pre-coating 110 is less than 10 g/m$^2$.

In certain possibly preferred embodiments of the composite 10, the pre-coating 110 applied to the textile layers 150 can further comprise a binder. The binder included in the coating 110 can be any suitable binder. Suitable binders include, but are not limited to, acrylic binders (e.g., nonionic acrylic binders), polyurethane binders (e.g., aliphatic polyurethane binders and polyether based polyurethane binders), epoxy binders, and combinations thereof. In certain possibly preferred embodiments, the binder is a cross-linking binder, such as a blocked isocyanate binder. It is noted that the binders used for the pre-coating are not limited to pressure sensitive materials.

When present, the binder can comprise any suitable amount of the pre-coating applied to the textile layers 150. The ratio of the amount (e.g., weight) of second inorganic particles present in the coating to the amount (e.g., weight) of binder solids present in the coating 110 typically is greater than about 1:1 (weight second inorganic particles:weight binder solids). In certain possibly preferred embodiments, the ratio of the amount (e.g., weight) of second inorganic particles present in the coating 110 to the amount (e.g., weight) of binder solids present in the coating typically is greater than about 2:1, or greater than about 3:1, or greater than about 4:1, or greater than about 5:1 (e.g., greater than about 6:1, greater than about 7:1, or greater than about 8:1). It is noted that when the pre-coating 110 is applied to the textile layers 150, the textile layer can have a much lower fabric tightness to achieve the same level of spike resistance.

In certain possibly preferred embodiments, the pre-coating 110 applied to the textile layers 150 can comprise a water-repellant finish in order to impart greater water repellency to the flexible panel 10. The water-repellant included in the coating can be any suitable water-repellant including, but not limited to, fluorochemicals, fluoropolymers, silicones, or polyolefin waxes.

In one embodiment, the composite 10 is incorporated into an article to protect the user from spike threats. Some articles include shirts, jackets, pants, vests, shoes, helmets, and hats. In one embodiment, the article contains a slot or pocket that the composite 10 can be placed in and out of. Preferably, the composite 10 is easily removable from the article for laundering.

In another embodiment, the composite 10 may also contain layers directed towards other threat resistance. The makeup of these additional layers would be chosen by the desired composite properties as well as the location of these layers within the composite 10. The additional layers may add additional spike, knife, and/or ballistic resistance or other desired properties. Examples of suitable known puncture resistant materials or components include, but are not limited to, mail (e.g., chain mail), metal plating, ceramic plating, layers of textile materials made from high tenacity yarns which layers have been impregnated or laminated with an adhesive or resin, or textile materials made from low denier high tenacity yarns in a tight woven form such as DuPont KEVLAR CORRECTIONAL® available from DuPont.

Commercially-available, flexible ballistic resistant panels such as those described above include, but are not limited to, the SPECTRA SHIELD® high-performance ballistic materials sold by Honeywell International Inc. Such ballistic resistant laminates are believed to be more fully described in U.S. Pat. No. 4,916,000 (Li et al.); U.S. Pat. No. 5,437,905 (Park); U.S. Pat. No. 5,443,882 (Park); U.S. Pat. No. 5,443,883 (Park); and U.S. Pat. No. 5,547,536 (Park), each of which is herein incorporated by reference. Other commercially available high performance flexible ballistic resistant materials include DYNEEMA UD® available from DSM DYNEEMA®, and GOLDFLEX® available from Honeywell International Inc. These high performance flexible ballistic materials may be used together with the composite 10 to enhance overall ballistic performance.

The process to form the textile layers where the textile layers comprising a plurality of interwoven yarns or fibers having a tenacity of about 5 or more grams per denier comprises the steps of (a) providing a first textile layer, (b) optionally contacting at least one of the surfaces of the first textile layer with a coating composition comprising a plurality of second inorganic particles having a diameter of about 20 µm or less, and (c) optionally drying the textile layer treated in step (b).

(d) Contacting the at least one of the surfaces (preferably the one already coated in step (b) and (c)) with a NonB-PSA composition, and (e) drying the textile layer treated in step (d).

The surface(s) of the textile layers can be contacted with the coating composition in any suitable manner. The textile layers can be contacted with the coating composition using conventional coating (e.g. knife coating, transfer coating, etc.), padding, spraying (wet or dry), foaming, printing, and exhaustion techniques. For example, the textile layers can be contacted with the coating composition using a padding technique in which the textile layer is immersed in the coating composition and then passed through a pair of nip rollers to remove any excess liquid. In such an embodiment, the nip rollers can be set at any suitable pressure, for example, at a pressure of about 280 kPa (40 psi). Alternatively, the surface of the textile layer to be coated can be first coated with a suitable adhesive, and then the particles can be applied to the adhesive.

The coated textile layers can be dried using any suitable technique at any suitable temperature. For example, the textile layers can be dried on a conventional tenter frame or range at a temperature of about 160° C. (320° F.) for approximately five minutes. The optional pre-coated textile layer comprises about 10 wt. % or less, based on the total weight of the textile layer, of a coating comprising a plurality of particles having a diameter of about 20 µm or less may be found in US Patent Publication 2007/0105471 (Wang et al.), incorporated herein by reference.

The coated textile layers 100 can be disposed adjacent to each other and held in place relative to each other by a suitable enclosure, such as a pocket or can be attached to each other by any known fastening means. In certain possibly preferred embodiments the coated textile layers 100 can also be sewn together in a desired pattern, for example, around the corners or along the perimeter of the stacked textile layers in order to secure the layers in the proper or desired arrangement. Additionally, the coated textile layers 100 may be adhered together using a patterned adhesive or other fastening means such as rivets, bolts, wires, tape, or clamps. In one embodiment, the layers are loose (not attached to each other using any adhesive or mechanical means and are placed together within the pouch.

EXAMPLES

Example 1

A woven para-aramid fabric was obtained that was comprised of 1000 denier para-aramid warp and fill yarns woven together in a plain weave construction with 22 ends/inch and 22 picks/inch. The fabric layer weighed 190 gsm after scouring to remove any yarn finishes present.

36 layers of the fabric had a total areal density of 6.84 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 2

A woven para-aramid fabric was obtained that was comprised of 1000 denier para-aramid warp and fill yarns woven together in a plain weave construction with 22 ends/inch and 22 picks/inch. The fabric layer weighed 190 gsm after scouring to remove any yarn finishes present. The fabric was coated in an aqueous bath comprising:

a) approximately 8% of an aqueous fumed alumina and b) approximately 1% of a non-PSA blocked isocyanate polyurethane-based cross-linking agent The coating was applied using a padding process (dip and squeeze at a roll pressure of 40 psi). The fabric was then dried at 320° F. The dry weight add-on of the chemical on the fabric was approximately 2% (i.e. 3.8 gsm). The coating was on both sides of the fabric due to the dip and squeeze process.

35 layers of the fabric had a total areal density of 6.78 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 3

A woven para-aramid fabric was obtained that was comprised of 1000 denier para-aramid warp and fill yarns woven together in a plain weave construction with 22 ends/inch and 22 picks/inch. The fabric layer weighed 190 gsm after scouring to remove any yarn finishes present. The fabric was coated with an aqueous coating mixture comprising:

a) 50% of an acrylic-based PSA with a glass transition temperature ($T_g$) of −55° C. and b) 1% of a thickening agent The coating was applied using a knife coater. The fabric was first coated on one side and dried at 320° F. The fabric was then coated on the other side and dried at 320° F. The total coating weight was approximately 60 gsm. The coated fabric was very tacky after drying. The blocking resistance rating as tested according to ASTM D751-06 (Standard Test Methods for Coated Fabrics) was 3—Blocking. Cloth surfaces separate with difficulty or coating is removed during separation.

27 layers of the fabric had a total areal density of 6.75 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 4

A woven para-aramid fabric was obtained that was comprised of 1000 denier para-aramid warp and fill yarns woven together in a plain weave construction with 22 ends/inch and 22 picks/inch. The fabric layer weighed 190 gsm after scouring to remove any yarn finishes present. The fabric was coated with an aqueous coating mixture comprising:

a) 15% of an acrylic-based PSA with a glass transition temperature ($T_g$) of −55° C. and b) 28% of silica particles with approximately 22 nm median primary particle size;

c) 0.5% of a C6 fluorochemical-based water and oil repellent;

d) 1% of a thickening agent.

The coating was applied using a knife coater. The fabric was first coated on one side and dried at 320° F. The fabric was then coated again on the other side and dried at 320° F. The total coating weight was approximately 60 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

27 layers of the fabric had a total areal density of 6.75 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 5

A woven para-aramid fabric was obtained that was comprised of 1000 denier para-aramid warp and fill yarns woven together in a plain weave construction with 22 ends/inch and 22 picks/inch. The fabric layer weighed 190 gsm after scouring to remove any yarn finishes present. The fabric was first pad-coated according to Example 2. The pre-coated fabric was then coated on both sides according to Example 4. The total coating weight was approximately 65 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

26 layers of the fabric with an areal density of 6.63 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 6

Example 5 was repeated except that the 1000 denier 22×22 para-aramid fabric was replaced with an 850 denier 31×31 plain weave para-aramid fabric. The fabric layer weighed 226 gsm after scouring to remove any yarn finishes present. The total coating weight was approximately 69 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

22 layers of the fabric with an areal density of 6.49 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 7

Example 5 was repeated except that that the 1000 denier 22×22 para-aramid fabric was replaced with an 840 denier 27×27 plain weave para-aramid fabric. The fabric layer weighed 200 gsm after scouring to remove any yarn finishes present. The total coating weight was approximately 50 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

26 layers of the fabric had a total areal density of 6.50 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 8

Example 7 was repeated except that the para-aramid fabric was coated only on one side, the strike side, with the coating composition of Example 4. The total coating weight was approximately 27 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

29 layers of the fabric had a total areal density of 6.58 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 9

Example 6 was repeated except that the acrylic-based PSA was replaced with a low-tack acrylic-based PSA in the coating formulation. The thickening agent was reduced to 0.5% to achieve a similar viscosity as in Example 6. The low-tack acrylic-based PSA has a glass transition temperature ($T_g$) of −43° C. The total coating weight was approximately 73 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

22 layers of the fabric had a total areal density of 6.58 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 10

Example 6 was repeated except that the acrylic-based PSA was replaced with a non-pressure sensitive polyurethane in the coating formulation. The polyurethane is a non-PSA elastomeric polyurethane with a glass transition temperature ($T_g$) of −47° C. The total coating weight was approximately 74 gsm. The coated fabric was not tacky after drying. The blocking resistance rating as tested according to ASTM D751-06 (Standard Test Methods for Coated Fabrics) was 1—No Blocking. Coated substrates separate without any evidence of adhering.

23 layers of the fabric had a total areal density of 6.90 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Example 11

A woven para-aramid fabric was obtained. The fabric was comprised of 1000 denier para-aramid warp and fill yarns woven together in a plain weave construction with 22 ends/inch and 22 picks/inch. The fabric layer weighed 190 gsm after scouring to remove any yarn finishes present. The fabric was coated with a coating mixture comprising:

a) 12% acrylic-based PSA with a glass transition temperature ($T_g$) of −55° C. and b) 20% of silica particles with approximately 22 nm median primary particle size;

c) 4% of a C6 fluorochemical-based water and oil repellent;

d) 1% of a thickening agent.

The coating was applied using a knife coater. The fabric was first coated on one side and dried at 320° F. The fabric was then coated again on the other side and dried at 320° F. The total coating weight was approximately 60 gsm. The coated fabric was slightly tacky after drying. The blocking resistance rating as tested according to ASTM D751-06 (Standard Test Methods for Coated Fabrics) was 2—Slight Blocking. Coated substrates must be slightly peeled to separate.

27 layers of the fabric had a total areal density of 6.75 kg/m² were freely assembled together by stacking them and inserting the stack into a water-resistant nylon pouch to form a multilayered pack. The multilayered pack was then conditioned at 24° C. and 55% RH for 24 hours before being subjected to stab tests.

Test Methods
Knife and Spike Stab Resistance Test Method

Knife and/or Spike stab resistance was tested according to NIJ Standard 0115.00 (2000), entitled "Stab Resistance of Personal Body Armor". The stab energy of the drop mass was set at 36 J (Protection Level 1 at "E2" strike energy). "Passing" is defined to be a penetration of less than 20 mm. The NIJ engineered spikes were used as the spike threat weapon and P1B knife was used for edged blade threat weapon.

Test Results
Table 1 summarizes the knife and spike stab resistant test results.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| No. of layers | 36 | 35 | 27 | 27 | 26 | 22 | 26 | 29 | 22 | 23 | 27 |
| Areal density | 6.84 kg/m² | 6.78 kg/m² | 6.75 kg/m² | 6.75 kg/m² | 6.63 kg/m² | 6.49 kg/m² | 6.50 kg/m² | 6.58 kg/m² | 6.58 kg/m² | 6.90 kg/m² | 6.75 kg/m² |
| Knife resistance | Fail | Fail | Fail | Pass | Pass | Pass | Pass | Pass | Pass | Fail | Fail |
| Spike resistance | Fail | Pass | Fail | Pass | Pass | Pass | Pass | Pass | Pass | Pass | Fail |

The examples clearly demonstrate the superior performance of the present invention against knife and spike stab. Examples using the invention materials (Examples 4-9) passed both the 36 J knife and spike stab tests at areal densities of 6.75 kg/m² or less. In contrast, the particle-based pre-coating alone (Ex. 2) is excellent against spike stab, but poor against knife stab. The pressure sensitive acrylic coating alone without particles (Ex. 3) is poor against both knife and spike stab. Additionally, the stack of layers of Ex. 3 also felt tacky after dry, which is not suitable for the intended applications. In Ex. 10, although the polyurethane polymer has very low glass transition temperature of −47° C., it is not pressure sensitive (non-tacky after dry). As a result, its performance against knife stab is inferior to pressure sensitive materials as shown in Ex. 6. When the ratio of particle to binder is too low as shown in Ex, 11, performance against both knife and spike stab is compromised. In addition, a low particle-to-binder ratio leads to a slightly tacky feel and an increased likelihood to block when layers are stacked together, which is not desirable for the intended applications.

Table 2 compares the weight (areal density) required to pass P1B knife stab resistant at 36 J of the present invention to those of prior art:

TABLE 2

| Product | Weight to pass KR1 (P1B Blade) | Data Source |
|---|---|---|
|  | 8.34 kg/m² | Example 1 from U.S. Pat. No. 8,450,222 |
|  | 7.96 kg/m² | Example 1 from US Patent Application 2011/0312238 |
| Ex. 4 | 6.75 kg/m² |  |
| Ex. 5 | 6.63 kg/m² |  |
| Ex. 6 | 6.49 kg/m² |  |
| Ex. 7 | 6.50 kg/m² |  |
| Ex. 8 | 6.58 kg/m² |  |

The Table shows that the present invention can pass P1B knife stab resistant test at 36 J at lower (better) areal density than the prior art. Furthermore, what really distinguishes the present invention from the prior art is the flexibility, both static and dynamic.

To quantify flexibility, the static flexibility test for a single layer fabric as described in US20120141720 was performed. For direct comparison, the same fabric construction (Ex. 5) was used as in US20120141720. Table 3 compares the flexibility results (angle of deflection) of the Ex. 5 fabric with the most flexible sample described in the examples section of US20120141720. The data clearly shows that the angle of deflection, and hence static flexibility, of the present invention is significantly higher than the most flexible sample from US20120141720.

TABLE 3

|  | Angle of Deflection (Flex 0°) | Angle of Deflection (Flex 90°) |
| --- | --- | --- |
| Ex. 5 | 66 | 59 |
| Ex. 3 of US20120141720 | 33 | 32 |

To further quantify flexibility, the dynamic flexibility test for multi-layer composite as described in US20120141720 was performed. For direct comparison, the same fabric construction, sample shape and size were used as in US20120141720. A stack of 28 layers of individual fabric of Ex. 5 (similar areal density as 30 layers of Example 3 in US20120141720) was tested at 22° C. and 55% relative humidity. Table 4 compares the dynamic flexibility results (force at 30 mm in Newton) of the Ex. 5 fabric with the most flexible sample described in US20120141720. The smaller the force, the more flexible the sample is.

TABLE 4

|  | Force at 30 mm in Newton |
| --- | --- |
| Ex. 5 | 304 |
| Ex. 3 of US2012/0141720 | 2004 |

The dynamic flexibility test result clearly demonstrates the increased flexibility of the Ex. 5 fabric over the prior art.

The base fabrics used in these examples are known to provide high levels of ballistic resistance. Binders, coatings, and finishes are generally known to reduce the ballistic resistance of anti-ballistic fabrics. While ballistic resistance testing according to NIJ 0101.06 was not directly performed on any of the examples listed, it was established in other testing to be acceptable.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A multi-threat protection composite comprising:
at least 15 textile layers, wherein each textile layer has an upper and lower surface;
a pre-coating on the upper and lower surface of each textile layer, wherein the pre-coating is in an amount of 10 wt. % or less and 0.1 wt. % or more based on the total weight of the textile layer, wherein the pre-coating comprising a plurality of alumina particles having a diameter of 20 μm or less;
a non-blocking pressure sensitive adhesive (NonB-PSA) coating composition on at least the upper surface of each textile layer overlaying the pre-coating, wherein the NonB-PSA coating composition comprises a pressure sensitive adhesive and a plurality of silica particles, wherein the ratio by weight of the silica particles to the pressure sensitive adhesive in the NonB-PSA coating composition is greater than 1.2, wherein the NonB-PSA coating composition is in an amount of at least 10 g/m$^2$ on each surface the NonB-PSA coating composition is located, and wherein the silica particles have a median primary particle size of less than 5 micrometers.

2. The multi-threat protection composite of claim 1, wherein each textile layer comprises a plurality of interwoven yarns or fibers having a tenacity of 5 or more grams per denier.

3. The multi-threat protection composite of claim 1, wherein the composite comprises at least 25 textile layers.

4. The multi-threat protection composite of claim 1, wherein the silica particles have a median primary particle size diameter of less than 1 micrometer.

5. The multi-threat protection composite of claim 1, wherein the silica particles have a median primary particle size diameter of less than 500 nanometers.

6. The multi-threat protection composite of claim 1, wherein the ratio by weight of the silica particles to the pressure sensitive adhesive is greater than 1.5.

7. The multi-threat protection composite of claim 1, wherein the NonB-PSA coating composition is in an amount of at least 20 g/m$^2$ on each surface the NonB-PSA coating composition is located.

8. The multi-threat protection composite of claim 1, wherein the NonB-PSA coating composition is in an amount of between 25 and 50 g/m$^2$ on each surface the NonB-PSA coating composition is located.

9. The multi-threat protection composite of claim 1, wherein the pressure sensitive elastic adhesive is selected from the group consisting of natural rubber, styrene-butadiene rubber, reclaimed rubber, butyl rubber, butadiene-acrylonitrile rubber, thermoplastic elastomers, polyacrylates, polyvinylalkylethers, and silicone.

10. The multi-threat protection composite of claim 1, wherein the pressure sensitive adhesive comprises an acrylic polymer.

11. The multi-threat protection composite of claim 1, wherein the pressure sensitive adhesive has a glass transition ($T_g$) of less than −40° C.

12. The multi-threat protection composite of claim 1, wherein the textile layers are woven textile layers comprising a plurality of warp yarns and weft yarns, wherein textile layers have a weave density of between 15 and 70 warp yarns per inch and between 15 and 70 weft yarns per inch.

13. The multi-threat protection composite of claim 2, wherein the yarns or fibers comprise fibers selected from the group consisting of gel-spun ultrahigh molecular weight polyethylene fibers, melt-spun polyethylene fibers, melt-spun nylon fibers, melt-spun polyester fibers, sintered polyethylene fibers, aramid fibers, PBO fibers, PBZT fibers, PIPD fibers, poly(6-hydroxy-2-napthoic acid-co-4-hydroxy-benzoic acid) fibers, carbon fibers, and combinations thereof.

14. The multi-threat protection composite of claim 1, wherein the yarns or fibers have a tenacity of 14 or more grams per denier.

15. An article of clothing comprising the composite of claim 1.

16. The article of clothing of claim 15, wherein the article is selected form the group consisting of shirt, jacket, pants, vest, shoes, helmet, and hat.

17. The multi-threat protection composite of claim 1, wherein the NonB-PSA coating composition further comprises a water repellent agent.

\* \* \* \* \*